United States Patent
Wang (10) Patent No.: US 12,221,128 B2
(45) Date of Patent: Feb. 11, 2025

(54) REDUCING AND PROCESSING SIMULATED AND REAL-WORLD RADAR DATA

(71) Applicant: GM Cruise Holdings LLC, San Francisco, CA (US)

(72) Inventor: Ke Wang, Santa Clara, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 299 days.

(21) Appl. No.: 18/059,155

(22) Filed: Nov. 28, 2022

(65) Prior Publication Data

US 2024/0174255 A1 May 30, 2024

(51) Int. Cl.
*B60W 60/00* (2020.01)
*G01S 13/50* (2006.01)

(52) U.S. Cl.
CPC ......... *B60W 60/001* (2020.02); *G01S 13/505* (2013.01); *B60W 2420/408* (2024.01)

(58) Field of Classification Search
CPC ........... B60W 60/001; B60W 2420/408; G01S 13/505
USPC ........................................................... 701/23
See application file for complete search history.

(56) References Cited

U.S. PATENT DOCUMENTS

| | | | |
|---|---|---|---|
| 11,500,087 B2 * | 11/2022 | Bagdonat | G08G 1/165 |
| 12,130,377 B2 * | 10/2024 | Yang | G01S 7/023 |
| 2024/0125921 A1 * | 4/2024 | Wang | G01S 7/2883 |
| 2024/0159869 A1 * | 5/2024 | Strobel | G01S 7/415 |

* cited by examiner

*Primary Examiner* — Andrew Joseph Rudy
(74) *Attorney, Agent, or Firm* — Dimitri Kirimis (57) ABSTRACT

A system for filtering RADAR data includes one or more graphical processing units (GPUs) for performing steps of a filtering process in parallel. For example, a first GPU or first portion of GPU circuitry calculates a threshold parabola for a tensor of RADAR data. In parallel, a second GPU or second portion of GPU circuitry separately reduces and indexes the tensor for comparison to the threshold parabola. The threshold parabola is compared to reduced and indexed data to filter the RADAR data. Importance sampling can also be used to reduce data, e.g., if the RADAR data includes four dimensions (range, Doppler, azimuth, and elevation).

20 Claims, 7 Drawing Sheets

REDUCING AND PROCESSING SIMULATED AND REAL-WORLD RADAR DATA

BACKGROUND

1. Technical Field

The present disclosure generally relates to driving simulation and, more specifically, to processing of RADAR data in simulation environments and real-world environments.

2. Introduction

An autonomous vehicle (AV) is a motorized vehicle that may navigate without a human driver. An exemplary AV may include various sensors, such as a camera sensor, a light detection and ranging (LIDAR) sensor, and a radio detection and ranging (RADAR) sensor, amongst others. The sensors collect data and measurements that the AV may use for operations such as navigation. The sensors may provide the data and measurements to an internal computing system of the AV, which may use the data and measurements to control a mechanical system of the AV, such as a vehicle propulsion system, a braking system, or a steering system.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can encounter a wide variety of situations while driving, such as different roadway geometries, different locations and behaviors of other vehicles and pedestrians, etc. Real-world road tests are used to train AVs how to respond in various situations. However, real-world road tests may not encounter every possibility, which can leave edge cases that AV software may not have been trained to handle. Simulations can be used to train the AV for interesting and rare scenarios.

Simulated RADAR data can include a very large amount of data that can be challenging to process efficiently. Likewise, RADAR data collected by sensors on the AV can include a large amount of data with a large amount of noise, and it can be challenging to process this data in real-time.

Embodiments of the present disclosure concern aspects of RADAR data processing. In general, RADAR data collected by AV RADAR sensors can include a very large amount of data. The data includes a high level of noise, and methods for processing the noisy data can be computationally intensive and slow. Improvements in RADAR data processing that provide increased efficiency are described herein. In some embodiments, the RADAR data processing described herein can be used for simulated RADAR data used in AV simulations. More efficient processing of RADAR data can improve simulation throughput, which can allow a greater number of simulations to be performed. Other embodiments apply to processing of real-world RADAR data collected by AVs as they are driving. In such embodiments, more efficient processing of RADAR data can enable faster identification of objects in the AV's environment and determination of properties of the objects from the RADAR data (e.g., velocity measurements of other vehicles).

RADAR sensors provide measurement data, in particular range, Doppler, and/or angle measurements (e.g., azimuth), with high precision in a radial direction. This allows one to accurately measure (radial) distances as well as (radial) velocities in a field of view of the RADAR system between different reflection points and the (respective) antenna of the RADAR system. RADAR sensors transmit (emit) RADAR signals into the RADAR sensor's field of view. The RADAR signals are reflected off of objects in the sensor's field of view, and the reflections are received by the RADAR sensor. Radial distances can be measured by utilizing the time-of-travel of the RADAR signal, and radial velocities are measured by utilizing the frequency shift caused by the Doppler effect. By repeatedly transmitting and receiving the RADAR signals, RADAR sensors are able to observe the field of view over time and provide measurement data in a series of RADAR frames.

Present RADAR data is typically in the form of a 3-dimensional, complex-valued tensor (a.k.a. RADAR cube) with dimensions corresponding to azimuth (angle), radial velocity (Doppler), and radial distance (range). In each of the RADAR frames, a plurality of reflection points can be detected; the reflection points can be considered a point cloud. Each point may have an associated power, which may have a magnitude measured in decibel-milliwatts (dBm). Thus, a given point may be defined by P(r. v. θ), where P is the power, r is range, v is Doppler, and θ is azimuth. The reflection points or point clouds in the RADAR frames do not contain a semantic meaning per se. Accordingly, the RADAR frames are processed in order to evaluate or understand the scene of the vehicle's surroundings.

One goal of processing the RADAR frames is to generate and filter detections. A detection is a point in a point cloud generated based on the RADAR data; a detection may correspond to an object in the field of view of a RADAR sensor, or to noise. The detection may include, for a given point, a position (e.g., range and azimuth) and speed (e.g., Doppler). A process for filtering detections includes processing the RADAR data to determine a threshold or threshold curve, and then comparing the RADAR data to the threshold or threshold curve. Points in the RADAR data that are over the threshold or threshold curve are identified as corresponding to detected objects.

As described herein, a RADAR noise filtering process can be performed using parallel processing at one or more steps. The parallel processing can be performed using one or more graphical processing units (GPUs), which enable a large number of calculations to be performed in parallel. For example, RADAR data can be segmented into multiple parts, and different segments of the RADAR data can be processed in parallel. Parallel processing can be used to determine the threshold or threshold curve; to reduce RADAR data along a particular dimension or dimensions; to compare segments of RADAR data (or reduced RADAR data) to a threshold or threshold curve; or at other points in the detection filtering process. By parallelizing the filtering process and using GPUs to efficiently process data in parallel, RADAR processing can be performed much more quickly.

In some cases, RADAR sensors can provide an additional angle, referred to as elevation. More specifically, azimuth refers to a horizontal angle relative to the sensor, and elevation refers to a vertical angle relative to the sensor. While adding the elevation dimension provides useful data, it also greatly enlarges the size of the data structure provided by the RADAR sensors, which makes the RADAR data more challenging to process efficiently. As described herein, importance sampling can be performed on this four-dimensional RADAR data to reduce noise and to reduce the amount of data that is further processed.

Figure 1:
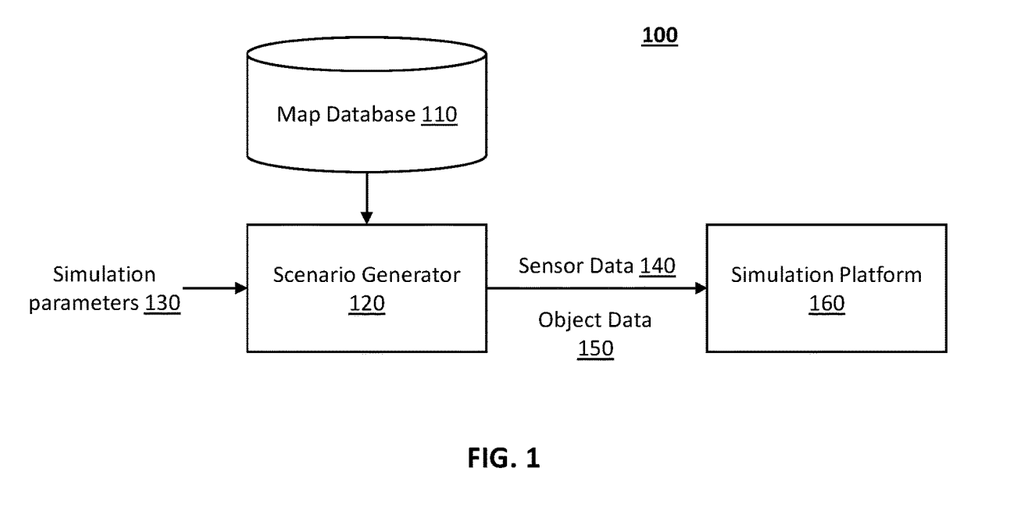
FIG. 1 illustrates an example simulation environment for training AVs, according to some examples of the present disclosure.
Figure 6:
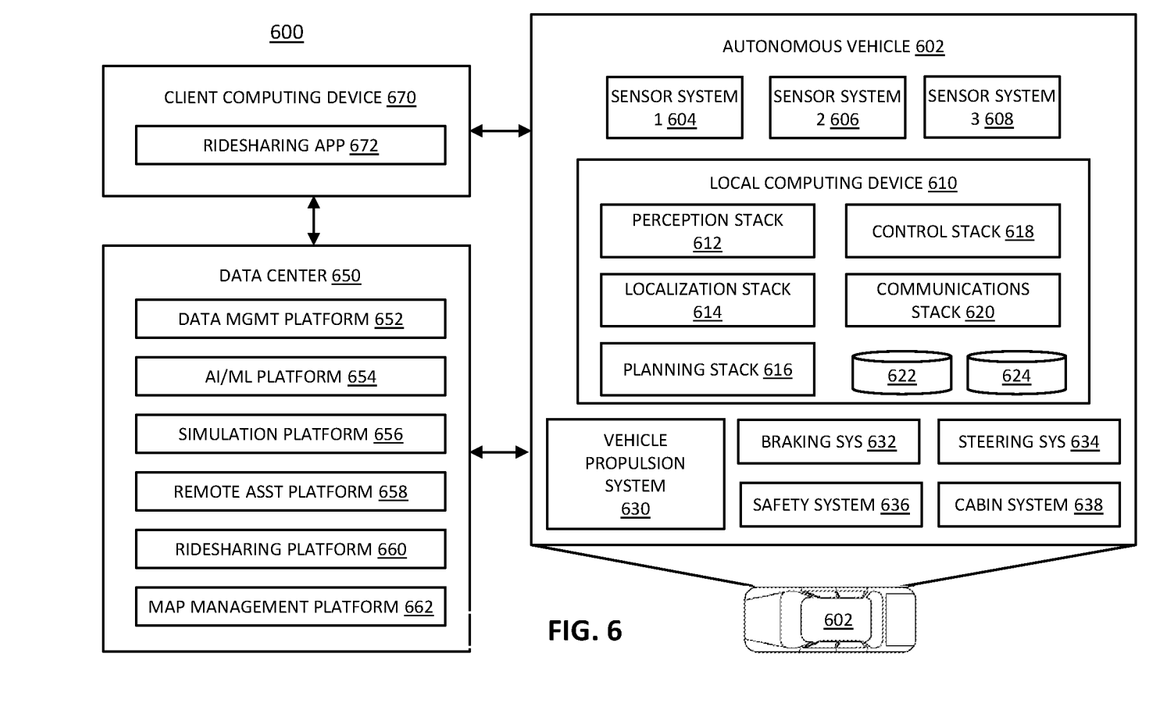
FIG. 6 illustrates an example system environment that may be used to facilitate autonomous vehicle (AV) dispatch and operations, according to some aspects of the disclosed technology.

The process for filtering detections described herein can be used for both real-world AV driving and for processing simulation data. An example AV is illustrated in FIG. 6; in this example, the RADAR processing may be performed by the perception stack 612 based on data from a RADAR sensor system. The detections may be used by the mapping and localization stack 614 as described below. An example simulation environment is illustrated in FIG. 1. In this example, the RADAR processing methods described herein can be performed by the simulation platform 160.

Example Simulation Environment

Simulation can be used to improve autonomous driving software and to expand the use of AVs in new environments. Traditionally, AVs have been tested by driving fleets of vehicles with AV sensor systems in a particular environment (e.g., a particular city). Over time, this exposes the AVs to the specific roadways within the environment, along with different scenarios along the roadways. Different scenarios may include, for example, different numbers and locations of nearby vehicles, different behaviors (e.g., maneuvers, speeds) of other vehicles, other dynamic elements in the environment (e.g., pedestrians, bicycles), roadway variations (e.g., lanes closed for construction), etc. While real-world testing is important to training AVs, it can be difficult to expose test AVs to each and every situation that may arise. Relying solely on real-world training can also make it difficult to scale AV fleets, e.g., to introduce AVs in new cities.

Simulation can be used to provide additional training for AV software. An example simulation environment 100 is illustrated in FIG. 1. The simulation environment 100 includes a map database 110, a scenario generator 120, and a simulation platform 160. The map database 110 includes data describing roadways, such as locations of roads, connections between roads, geometric information (e.g., road and lane widths, slopes, angles between roads), road names, speed limits, traffic flow regulations, toll information, etc. The map database 110 may also include data describing other features in or along the roads, such as bike lanes, sidewalks, crosswalks, traffic lights, stop signs, parking spaces, medians, etc. The map database 110 may further include data describing other features in the environments of the roads, such as data describing buildings (e.g., locations of buildings, building geometry, building types), trees, other signage, guardrails, streetlamps, lighting at different times of day, etc. The map database 110 may include data for a specific geographic area (e.g., a particular city, state, or other service area), or the map database 110 may include data across multiple geographic areas (e.g., multiple cities, all mapped portions of a country or the world, etc.).

The scenario generator 120 is a system for generating autonomous driving scenarios for simulation based on one or more specific locations in the map database 110. The scenario generator 120 may be implemented by one or more computer systems, e.g., the processor-based system illustrated in FIG. 7. The scenario generator 120 can select a location, or set of locations, in the map database 110 that match received simulation parameters 130. The simulation parameters 130 provide constraints for the scenario generator 120. For example, the simulation parameters 130 may indicate that a user wants to simulate three-way intersections with two stop signs. The scenario generator 120 searches the map database 110 to find locations that match the simulation parameters 130.

Having found the matching locations, the scenario generator 120 creates simulations at the identified locations. Different simulations may have different attributes, such as other vehicle types, vehicle locations, vehicle speeds, pedestrian activity, etc. In some cases, the simulation parameters 130 may include a particular scenario description, e.g., the AV is approaching a stop sign in the 3-way intersection, and another vehicle approaches from the road without a stop sign. The scenario generator 120 can generate various permutations of this scenario, e.g., including other vehicles in front of or behind the AV, a vehicle approaching from the third roadway, different pedestrian activity, different lighting conditions, etc.

The scenario generator 120 outputs the created autonomous driving scenarios (referred to generally as "scenarios") to a simulation platform 160. The scenarios may be in the form of data files. The data files may include simulations of sensor data 140 and object data 150, referred to jointly as scenario data. The sensor data 140 may include simulations of data output by any of the AV sensors, e.g., RADAR, LIDAR, cameras, etc. The sensor data 140 may include or be based on actual sensor data files collected by AVs. Additional simulated data may be added to the actual sensor data files based on the simulation parameters 130. The object data 150 may describe the locations of all dynamic elements in the scene (e.g., the locations of the AV, other vehicles, pedestrians, bicycles, etc.). For example, the object data 150 may include a three-dimensional simulation matrix describing the environment of the AV, or a two-dimensional map describing the environment of the AV. Additional object data 150 may describe object velocities or other object behaviors, such as planned trajectories. The data files may additionally or alternatively include data from the map database 110, or data identifying relevant data in the map database 110.

The simulation platform 160 enables testing and validation of autonomous driving algorithms. The simulation platform 160 runs simulations based on the created scenario data 140 and 150. The simulation platform 160 can reproduce real-world scenarios based on data from the scenarios. In some embodiments, the simulation platform 160 combines the scenario data with data captured by AVs, e.g., rendering geospatial information and road infrastructure (e.g., streets, lanes, crosswalks, traffic lights, stop signs, etc.) obtained from the map database 110. In some embodiments, the simulation platform 160 models behavior of other vehicles, bicycles, pedestrians, and other dynamic elements. The simulation platform 160 simulates an AV's behavior and provides outputs of a simulated driving event, e.g., final locations of the AV and/or any other dynamic element in the simulation. The simulation platform 160 may be an example of the simulation platform 656, described with respect to an AV management system illustrated in FIG. 6.

Running simulations can accelerate AV development, e.g., to train the AV how to behave in new environments, and to train the AV how to behave in a wide variety of situations. The simulation environment 100 is particularly useful for training AV software for rare or unusual cases that may not arise in real-world testing, but that an AV may still encounter, e.g., after a testing phase.

The scenario generator 120 may generate a very large number of scenarios. For example, if the geographic constraints result in a lot of matching locations (e.g., a four-way stop, or a two-lane highway), the scenario generator 120 may generate permutations on each of the matching locations, which can output a very large number of scenarios. Furthermore, the sensor data 140 provided for each scenario may be quite large, and processing the simulated sensor data 140 can be cumbersome. Thus, more efficiently processing sensor data, and in particular, RADAR data, can improve efficiency of the simulation and lead to more meaningful improvement of the AV software.

Example RADAR Data Processing System

Figure 2:
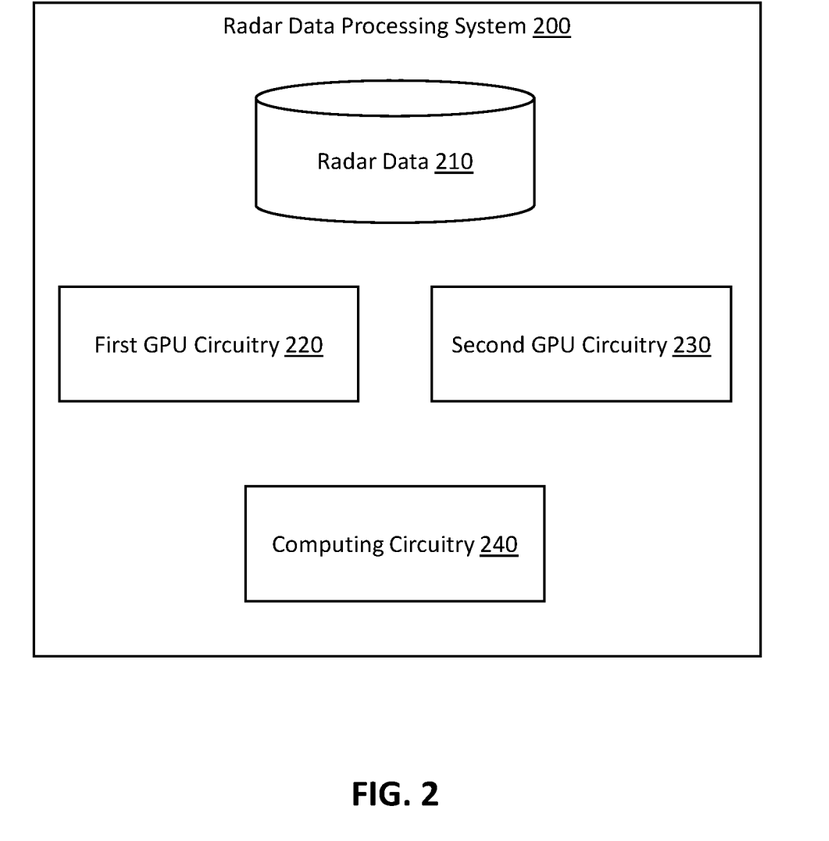
FIG. 2 illustrates an example RADAR data processing system, according to some examples of the present disclosure.

FIG. 2 illustrates an example RADAR data processing system 200, according to some examples of the present disclosure. In some examples, the RADAR data processing system 200 is part of a data simulation system, e.g., the simulation environment 100. For example, the RADAR data processing system 200 may be an element of the simulation platform 160. In other examples, the RADAR data processing system 200 is part of an onboard computer of an AV. For example, the RADAR data processing system 200 may be part of the local computing device 610 of the AV 602.

The RADAR data processing system 200 stores RADAR data 210. The RADAR data 210 may be received from the scenario generator 120 in the simulation example. Alternatively, the RADAR data 210 may be received from one or more RADAR sensors on an AV 602. The RADAR data 210 may be in the form of a multi-dimensional tensor. In this example, the RADAR data 210 is stored in a local memory or buffer of the RADAR data processing system 200. In other examples, the RADAR data 210 may be stored outside the RADAR data processing system 200 and accessed by components of the RADAR data processing system 200. The memory or buffer of the RADAR data processing system 200 may also store intermediate results of the process 300 described below.

In this example, the RADAR data processing system 200 includes first GPU circuitry 220 and second GPU circuitry 230. The first GPU circuitry 220 and second GPU circuitry 230 are configured to perform parallel processing tasks. In one example, the first GPU circuitry 220 is a first GPU or first set of multiple GPUs, and the second GPU circuitry 230 is a second GPU or second set of multiple GPUs. In another example, the first GPU circuitry 220 includes a first portion of a GPU, and the second GPU circuitry 230 includes a second portion of the same GPU. The RADAR data processing system 200 may have additional GPU circuitry not specifically illustrated in FIG. 2. For example, a GPU that includes the first GPU circuitry 220 and the second GPU circuitry 230 may further include a third portion, a fourth portion, etc., where each portion can be assigned to a different task or set of tasks. As another example, the RADAR data processing system 200 may include a third GPU or third set of GPUs, a fourth GPU or fourth set of GPUS, etc., where each GPU or set of GPUs can be assigned to a different task or set of tasks. In some cases, a GPU, or some portion of a GPU, can be assigned to multiple different tasks that are performed in sequence. For example, the first GPU circuitry 220 may, at a first time, be used to compute a threshold parabola, and at a second time (after the threshold parabola has already been computed), be used to refine RADAR detections.

In the example shown in FIG. 2, the RADAR data processing system 200 further includes computing circuitry 240. The computing circuitry 240 may be an example of the processor-based system 700 described below with respect to FIG. 7. The computing circuitry 240 may be used for non-parallel computing tasks, e.g., splitting data and assigning it to parallel computing resources 220 and 230, merging previously split and processed data, etc. In some embodiments, the RADAR data processing system 200 includes only GPU processing circuitry, and does not include the computing circuitry 240.

In some embodiments, the RADAR data processing system 200 may have a different configuration than that shown, e.g., the RADAR data processing system 200 may be distributed across multiple different devices, the RADAR data 210 may be stored on the computing circuitry 240 or on another memory outside the RADAR data processing system 200, etc.

Example Process for Filtering RADAR Detections

Figure 3:
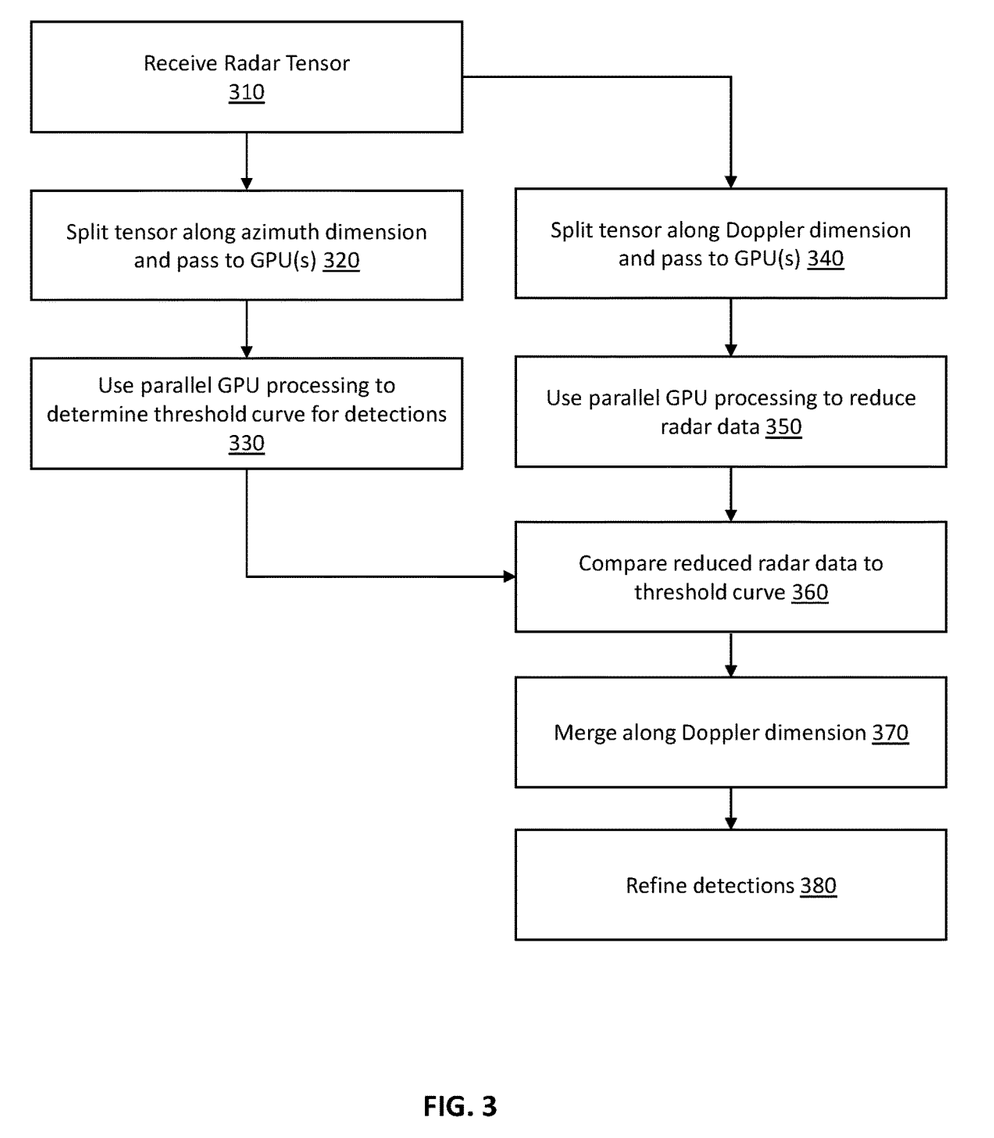
FIG. 3 illustrates an example process of filtering RADAR detections, according to some examples of the present disclosure.

FIG. 3 illustrates an example process of filtering RADAR detections, according to some examples of the present disclosure. A RADAR processing system, such as the RADAR data processing system 200 shown in FIG. 2, receives 310 a RADAR tensor. The RADAR tensor includes multiple dimensions. For example, the RADAR tensor may include three-dimensions (e.g., range, Doppler, and azimuth). In some examples, the RADAR tensor further includes a fourth dimension, elevation. The RADAR tensor may be received from a simulation system (e.g., the scenario generator 120) or from a RADAR sensor on an AV (e.g., the sensor system 608).

The RADAR processing system (e.g., the computing circuitry 240) splits 320 the tensor along the azimuth dimension and passes the split tensor to a GPU for processing. For example, if the tensor has azimuth angles in the range of 0° to 360°, the RADAR processing system can split the tensor into a first sub-tensor with azimuths in the range of 0° to 180°, and a second sub-tensor with azimuths in the range of 180° to 360°. The RADAR processing system can alternatively split the RADAR tensor into three, four, or more sub-tensors along the azimuth dimension. The RADAR processing system can pass the sub-tensors to the first GPU circuitry 220 (e.g., a first GPU). Different portions of the first GPU circuitry 220 can then process the different sub-tensors in parallel.

Figure 4:
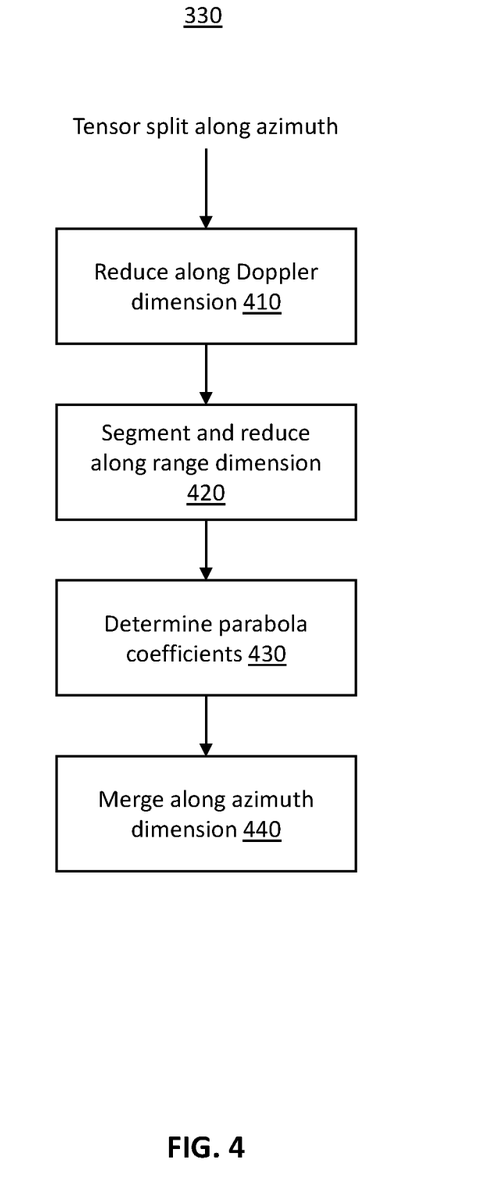
FIG. 4 illustrates an example process for determining a threshold parabola, according to some examples of the present disclosure.

More particularly, the RADAR processing system (e.g., the first GPU circuitry 220) uses parallel GPU processing to determine 330 a threshold or threshold curve for detections. The threshold may be in the form of a threshold parabola, where data over the parabola can be identified as valid data. For example, an x-axis of a parabola is the range dimension, and the y-axis of the parabola is power. A RADAR data point having a particular range and power is compared to the curve by comparing the power (y-dimension) of the parabola at the range of the data point to the power of the data point; if the power of the parabola at that range is less than the power of the data point, the data point is identified as valid. The parabola is used as a threshold to remove noise from the RADAR data. To determine the threshold parabola, the first GPU circuitry 220 can reduce each sub-tensor along one or more dimensions, e.g., reduce each of the sub-tensors along the Doppler dimension and range dimension. In some embodiments, the first GPU circuitry 220 may perform additional segmentation of the sub-tensors and perform parallel processing on individual segments of the sub-tensors. An example process for using parallel processing to determine the threshold parabola is illustrated in FIG. 4.

The RADAR processing system (e.g., the computing circuitry 240) also splits 340 the tensor along the Doppler dimension and passes the split tensor to a GPU for processing. For example, if the tensor has Doppler readings (e.g., velocities) in the range of 0 miles per hour (mph) to 100 mph, the RADAR processing system can split the tensor into a first sub-tensor with Dopplers in the range of 0 mph to 50 mph, and a second sub-tensor with Dopplers in the range of 50 mph to 100 mph. The RADAR processing system can alternatively split the RADAR tensor into three, four, or more sub-tensors along the Doppler dimension. The RADAR processing system can pass the sub-tensors to the second GPU circuitry 230 (e.g., a second GPU). Different portions of the second GPU circuitry 230 can then process the different sub-tensors in parallel, and in parallel with the first GPU circuitry 220 that is processing the azimuth-split tensor, as described above.

The RADAR processing system (e.g., the second GPU circuitry 230) uses parallel GPU processing to reduce 350 the RADAR data. For example, the second GPU circuitry 230 may reduce each sub-tensor (previously split along the Doppler dimension) along the azimuth dimension. Reducing a tensor or sub-tensor along a particular dimension (here, the azimuth dimension) involves applying a many-to-one data operation in the dimension to be reduced. Many-to-one operations are operations that generate a single value from multiple values, such as summing values along the dimension, or finding a maximum value of the data along the dimension. In the case of azimuth dimension reduction, the second GPU circuitry 230 may determine and select the maximum value in the azimuth dimension of each sub-tensor. The second GPU circuitry 230 may index each of the reduced sub-tensors, e.g., by identifying the index along the azimuth dimension for the determined maximum value. In some embodiments, the index itself may be stored in an array or tensor, i.e., the second GPU circuitry 230 may provide a tensor of indices, each index corresponding to the position of a maximum value in the azimuth direction in the original tensor or sub-tensors.

The RADAR processing system (e.g., the second GPU circuitry 230) compares 360 the reduced RADAR data resulting from steps 340 and 350 to the threshold curve determined at step 330 to identify RADAR detections in the RADAR data that correspond to objects, and filter (i.e., remove) the RADAR detections that correspond to noise. The second GPU circuitry 230 may perform the comparison using sparse map representation of the tensor data. Indexed data that is over the threshold parabola can be identified as valid RADAR signals, while other data may be marked as invalid so that they may be eliminated as noise. The second GPU circuitry 230 may save the indices of the valid data in a buffer or other memory.

The RADAR processing system (e.g., the computing circuitry 240, or other circuitry, such as the first or second GPU circuitry 220 or 230) merges 370 valid RADAR data identified at step 360 in the Doppler dimension. The RADAR processing system (e.g., the computing circuitry 240, or other circuitry, such as the first or second GPU circuitry 220 or 230) refines 380 the detections of valid RADAR data. For example, the RADAR processing system may flatten and compact the tensor of the valid RADAR data, e.g., to remove any data marked invalid in step 360. Refining the detections may involve local data operations within the RADAR data tensor. For example, for a detection at a location (r. v. θ) in the tensor, the RADAR processing system (e.g., the computing circuitry 240) reads nearby data, e.g., the data at (r. v. θ+1) and (r. v. θ−1). The RADAR processing system performs an operation on this data to determine a refined data output, e.g., the RADAR processing system performs a parabolic curve fitting of the three data points and chooses the peak of the parabola curve as the output value.

FIG. 4 illustrates an example process for determining a threshold parabola, according to some examples of the present disclosure. FIG. 4 illustrates details of an example process for step 330 in FIG. 3 that may be performed by the first GPU circuitry 220. In general, the threshold curve may be determined by three points using the Lagrange polynomial method, as described below. The three points for determining the parabola may be referred to as $(x_1, y_1)$, $(x_2, y_2)$, and $(x_3, y_3)$.

The first GPU circuitry 220 receives a tensor split in the azimuth dimension, as described with respect to step 320. For each sub-tensor, a respective portion of the first GPU circuitry 220 reduces 410 the sub-tensor along the Doppler dimension, e.g., by performing a many-to-one operation (as described with respect to FIG. 3) along the Doppler dimension. The respective portion of the first GPU circuitry 220 segments 420 the reduced sub-tensor along the range dimension, and reduces each segment along the range dimension. Different segments in the range dimension may be reduced in parallel by different portions of the first GPU circuitry 220. The first GPU circuitry 220 then determines 430 parabola coefficients based on the reduced and segmented RADAR data. Finally, the first GPU circuitry 220 merges 440 the parabola coefficients along the azimuth dimension, resulting in the threshold parabola used to identify valid RADAR data.

For example, a middle range (e.g., the median range, or the mean range) of each of the three range segments may be used as $x_1$, $x_2$, and $x_3$. The average P(r. v=argmax(n−1)(P), θ) of each of the three range sections may be used as $y_1$, $y_2$, $y_3$, where P(r. v=argmax(n−1)(P), θ) is the second largest power along the Doppler dimension. Argmax is an operation that finds the argument (e.g., Doppler v) that gives the maximum value from a target function (e.g., Power P); argmax(n−1) finds the argument (here, Doppler v) that gives the second-highest value from the target function (here, Power P). The threshold curve can then be determined along the range per azimuth $P_{parabola}$(r. v. θ)=a(θ)$r^2$+b(θ)r+c(θ), where a(θ), b(θ), c(θ) are the parabola coefficients per azimuth dimension.

Continuing this example, to use the parabola curve calculated as described above for thresholding at step 260, the second GPU circuitry 230 may first compute the highest power along the azimuth dimension P(r. v, θ=argmax(P)), and then compare this highest power in the range and Doppler dimension with the threshold parabola. For each range r and v Doppler, the second GPU circuitry 230 compares P(r. v. θ=argmax(P)) with $P_{parabola}$(r, v, θ=argmax (P)), where the $P_{parabola}$ curve is as defined above.

Example Importance Sampling for Reducing RADAR Data

Figure 5:
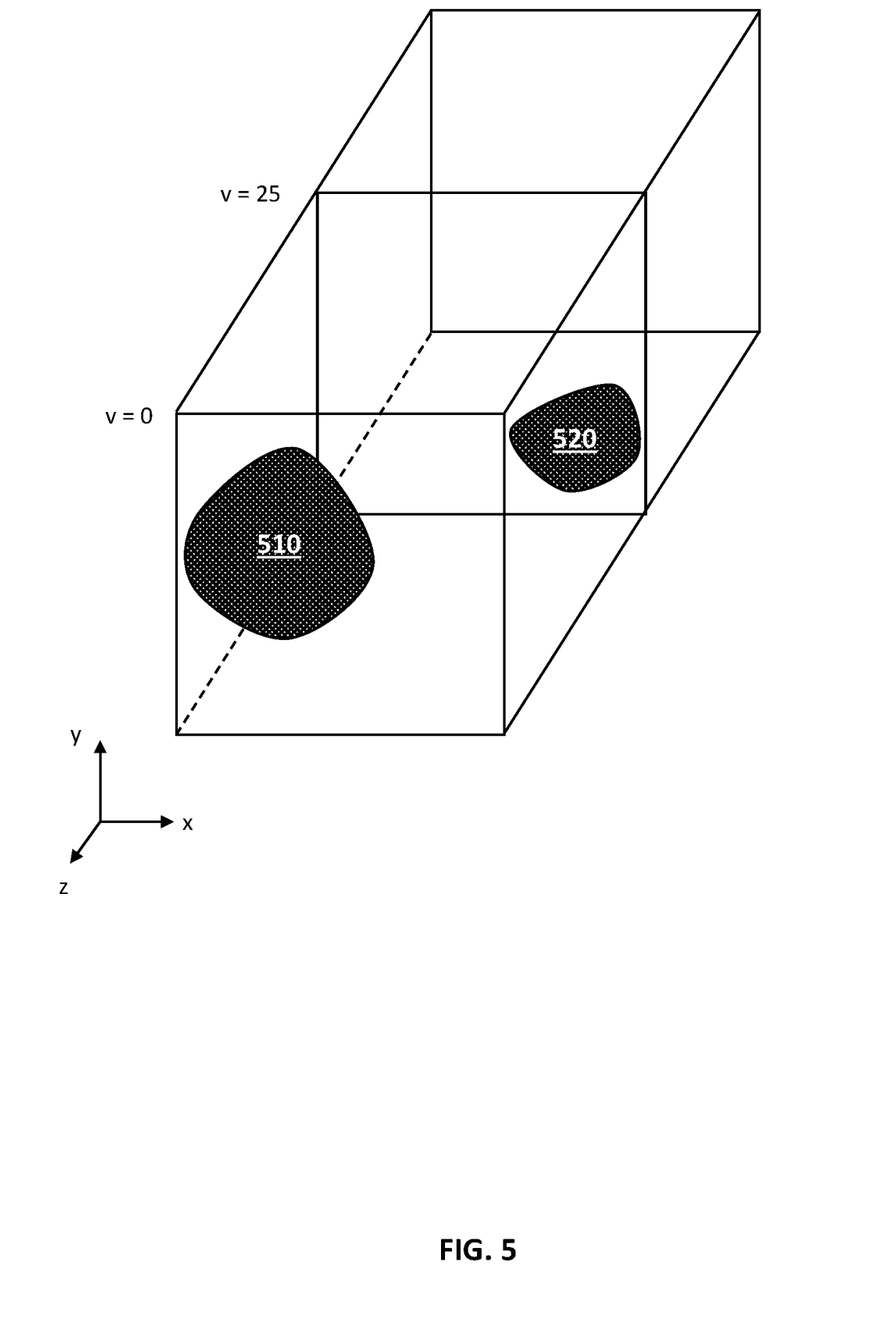
FIG. 5 illustrates a visual example of importance sampling of RADAR data, according to some examples of the present disclosure.

FIG. 5 illustrates a visual example of importance sampling of RADAR data, according to some examples of the present disclosure. The image shown in FIG. 5 represents three dimensions of RADAR data. In this example, the z-dimension represents Doppler or velocity. The x and y dimensions may represent range, azimuth, or elevation. In some embodiments that use importance sampling, the RADAR data is a four-dimensional RADAR tensor that includes values for range, Doppler, azimuth, or elevation. However, due to drawing limitations, only 3 dimensions are illustrated.

In a driving scenario, there are typically a small set of velocities observed in the objects and actors around the AV. Most parts of the environment around an AV (e.g., roads, trees, traffic lights, parked cars, buildings, etc.) are stationary, with a velocity of θ. Some dynamic actors (e.g., other cars, bikes, pedestrians) have a non-zero velocity. Different dynamic actors have different velocities, but there is typically a finite set of relevant velocities in a scene. Certain actors may have a same velocity or approximately the same velocity, e.g., multiple pedestrians walking at 3 miles per hour (mph), cars on a highway traveling at 60 mph, etc. Thus, in the RADAR tensor, only select points along the Doppler dimension include valid data, while large ranges of the Doppler do not include valid data.

FIG. 5 provides an example visualization of areas of a RADAR tensor that include valid data. In this example, a large set of points 510 represent stationary objects or regions in an AV's environment. These points are within the v=0 slice of the RADAR data, where v is velocity or Doppler. A second set of points 520 represent an object with a velocity of 25 mph, in the v=25 slice of the RADAR data. These points represent a car driving in the environment of the AV at 25 mph. Additional dimensions of the RADAR data provide location information for the stationary objects and the moving car (range from the AV RADAR sensor, and azimuth and elevation angles from the AV RADAR sensor).

A RADAR processing system (e.g., the computing circuitry 240 of the RADAR data processing system 200) may perform importance sampling of the RADAR data to identify the relevant slices of a RADAR tensor that may include valid data. For example, the RADAR processing system may use a Monte Carlo sampling method.

For example, the importance sampling may involve reducing the size of the Doppler dimension, e.g., by sampling the most important slices of Doppler data. For example, the RADAR processing system may determine the top 16 most important slices of Doppler data and discard the other slices, reducing the Doppler dimensions from its initial size (e.g., 128) to 16. In other embodiments, the Doppler dimension may have a different initial size, and a different number of slices may be selected.

In addition to Monte Carlo sampling, the RADAR processing system can use non-RADAR data to identify slices that are likely important. For example, the speed of the vehicle can be used to determine the Doppler slice for static objects, e.g., if the vehicle is traveling at 5 mph, static objects have an apparent velocity of −5 mph. As another example, in a simulation environment, velocity distribution information of an input scene can indicate other important slices. For example, an oncoming vehicle traveling at 5 mph has an apparent velocity of −10 mph, which indicates that the −10 mph Doppler slice is important.

The importance sampling helps identify Doppler slices that are more likely to contain valid detections, and less likely to contain noise. The importance sampling reduces the overall size of the tensor. If importance sampling is performed prior to the noise filtering process described with respect to FIGS. 3 and 4, this further speeds the noise filtering process due to the reduced amount of data.

Example AV and AV Management System

Turning now to FIG. 6, this figure illustrates an example of an AV management system 600. One of ordinary skill in the art will understand that, for the AV management system 600 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 may navigate about roadways without a human driver based on sensor signals generated by multiple sensor systems 604, 606, and 608. The sensor systems 604-608 may include different types of sensors and may be arranged about the AV 602. For instance, the sensor systems 604-608 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 may be a camera system, the sensor system 606 may be a LIDAR system, and the sensor system 608 may be a RADAR system. Other embodiments may include any other number and type of sensors.

AV 602 may also include several mechanical systems that may be used to maneuver or operate AV 602. For instance, the mechanical systems may include vehicle propulsion system 630, braking system 632, steering system 634, safety system 636, and cabin system 638, among other systems. Vehicle propulsion system 630 may include an electric motor, an internal combustion engine, or both. The braking system 632 may include an engine brake, a wheel braking system (e.g., a disc braking system that utilizes brake pads), hydraulics, actuators, and/or any other suitable componentry configured to assist in decelerating AV 602. The steering system 634 may include suitable componentry configured to control the direction of movement of the AV 602 during navigation. Safety system 636 may include lights and signal indicators, a parking brake, airbags, and so forth. The cabin system 638 may include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 may include one or more client interfaces (e.g., Graphical User Interfaces (GUIs), Voice User Interfaces (VUIs), etc.) for controlling certain aspects of the mechanical systems 630-638.

AV 602 may additionally include a local computing device 610 that is in communication with the sensor systems 604-608, the mechanical systems 630-638, the data center 650, and the client computing device 670, among other systems. The local computing device 610 may include one or more processors and memory, including instructions that may be executed by the one or more processors. The instructions may make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an High Definition (HD) geospatial database 622, and an AV operational database 624, among other stacks and systems.

Perception stack 612 may enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 may detect and classify objects and determine their current and predicted locations, speeds, directions, and the like. In addition, the perception stack 612 may determine the free space around the AV 602 (e.g., to maintain a safe distance from other objects, change lanes, park the AV, etc.). The perception stack 612 may also identify environmental uncertainties, such as where to look for moving objects, flag areas that may be obscured or blocked from view, and so forth.

Mapping and localization stack 614 may determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 may compare sensor data captured in real-time by the sensor systems 604-608 to data in the HD geospatial database 622 to determine its precise (e.g., accurate to the order of a few centimeters or less) position and orientation. The AV 602 may focus its search based on sensor data from one or more first sensor systems (e.g., GPS) by matching sensor data from one or more second sensor systems (e.g., LIDAR). If the mapping and localization information from one system is unavailable, the AV 602 may use mapping and localization information from a redundant system and/or from remote data sources.

The planning stack 616 may determine how to maneuver or operate the AV 602 safely and efficiently in its environment. For example, the planning stack 616 may receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 may determine multiple sets of one or more mechanical operations that the AV 602 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 may select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 may manage the operation of the vehicle propulsion system 630, the braking system 632, the steering system 634, the safety system 636, and the cabin system 638. The control stack 618 may receive sensor signals from the sensor systems 604-608 as well as communicate with other stacks or components of the local computing device 610 or a remote system (e.g., the data center 650) to effectuate operation of the AV 602. For example, the control stack 618 may implement the final path or actions from the multiple paths or actions provided by the planning stack 616. Implementation may involve turning the routes and decisions from the planning stack 616 into commands for the actuators that control the AV's steering, throttle, brake, and drive unit.

The communication stack 620 may transmit and receive signals between the various stacks and other components of the AV 602 and between the AV 602, the data center 650, the client computing device 670, and other remote systems. The communication stack 620 may enable the local computing device 610 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 may store HD maps and related data of the streets upon which the AV 602 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 624 may store raw AV data generated by the sensor systems 604-608 and other components of the AV 602 and/or data received by the AV 602 from remote systems (e.g., the data center 650, the client computing device 670, etc.). In some embodiments, the raw AV data may include HD LIDAR point cloud data, image or video data, RADAR data, GPS data, and other sensor data that the data center 650 may use for creating or updating AV geospatial data as discussed further below with respect to FIG. 5 and elsewhere in the present disclosure.

The data center 650 may be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 may include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 may send and receive various signals to and from the AV 602 and the client computing device 670. These signals may include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 may access data stored by the data management platform 652 to provide their respective services.

The AI/ML platform 654 may provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists may prepare data sets from the data management platform 652; select, design, and train machine learning models; evaluate, refine, and deploy the models; maintain, monitor, and retrain the models; and so on.

The simulation platform 656 may enable testing and validation of the algorithms, machine learning models, neural networks, and other development efforts for the AV 602, the remote assistance platform 658, the ridesharing platform 660, the map management platform 662, and other platforms and systems. The simulation platform 656 may replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 may generate and transmit instructions regarding the operation of the AV 602. For example, in response to an output of the AI/ML platform 654 or other system of the data center 650, the remote assistance platform 658 may prepare instructions for one or more stacks or other components of the AV 602.

The ridesharing platform 660 may interact with a customer of a ridesharing service via a ridesharing application 672 executing on the client computing device 670. The client computing device 670 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 may be a customer's mobile computing device or a computing device integrated with the AV 602 (e.g., the local computing device 610). The ridesharing platform 660 may receive requests to be picked up or dropped off from the ridesharing application 672 and dispatch the AV 602 for the trip.

Map management platform 662 may provide a set of tools for the manipulation and management of geographic and spatial (geospatial) and related attribute data. The data management platform 652 may receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data may be processed, and map management platform 662 may render base representations (e.g., tiles (2D), bounding volumes (3D), etc.) of the AV geospatial data to enable users to view, query, label, edit, and otherwise interact with the data. Map management platform 662 may manage workflows and tasks for operating on the AV geospatial data. Map management platform 662 may control access to the AV geospatial data, including granting or limiting access to the AV geospatial data based on user-based, role-based, group-based, task-based, and other attribute-based access control mechanisms. Map management platform 662 may provide version control for the AV geospatial data, such as to track specific changes that (human or machine) map editors have made to the data and to revert changes when necessary. Map management platform 662 may administer release management of the AV geospatial data, including distributing suitable iterations of the data to different users, computing devices, AVs, and other consumers of HD maps. Map management platform 662 may provide analytics regarding the AV geospatial data and related data, such as to generate insights relating to the throughput and quality of mapping tasks.

In some embodiments, the map viewing services of map management platform 662 may be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processor-Based Computer System

Figure 7:
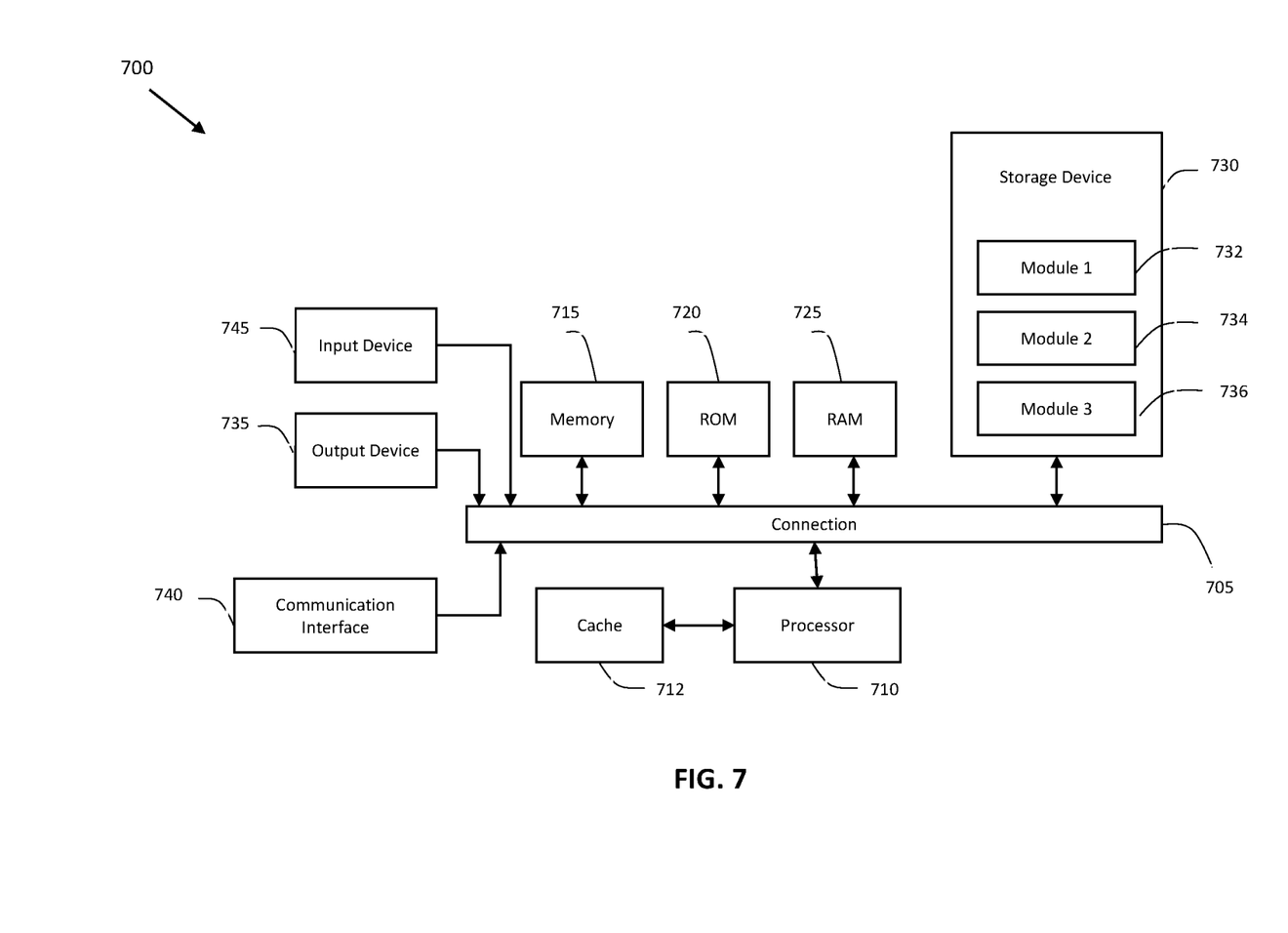
FIG. 7 illustrates an example processor-based system with which some aspects of the subject technology may be implemented.

FIG. 6 illustrates an example processor-based system with which some aspects of the subject technology may be implemented. For example, processor-based system 700 may be any computing device making up, or any component thereof in which the components of the system are in communication with each other using connection 705. Connection 705 may be a physical connection via a bus, or a direct connection into processor 710, such as in a chipset architecture. Connection 705 may also be a virtual connection, networked connection, or logical connection.

In some embodiments, computing system 700 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 may include a cache of high-speed memory 712 connected directly with, in close proximity to, or integrated as part of processor 710.

Processor 710 may include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms known to those of skill in the art. In some instances, multimodal systems may enable a user to provide multiple types of input/output to communicate with computing system 700. Computing system 700 may include communications interface 740, which may generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 may include software services, servers, services, etc., that when the code that defines such software is executed by the processor 710, it causes the system 700 to perform a function. In some embodiments, a hardware service that performs a particular function may include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a computer implemented method for filtering RADAR data, the method including receiving data representing a RADAR signal, the data including a tensor having multiple dimensions; calculating a threshold curve using first GPU circuitry, where a first portion of the first GPU circuitry processes a first portion of the tensor, and a second portion of the first GPU circuitry processes a second portion of the tensor; reducing the data representing the RADAR signal using second GPU circuitry; comparing the reduced data to the threshold curve; and outputting detections based on the threshold curve.

Example 2 provides the method of example 1, the tensor including an azimuth dimension and a Doppler dimension, where calculating the threshold curve using the first GPU circuitry includes splitting the data in the tensor along the azimuth dimension, the first portion of the tensor including a first range of azimuths, and the first portion of the tensor including a second range of azimuths; reducing, by the first portion of the first GPU circuitry, the first portion of the tensor along the Doppler dimension; and reducing, by the second portion of the first GPU circuitry, the second portion of the tensor along the Doppler dimension.

Example 3 provides the method of example 2, the tensor further including a range dimension, where calculating the threshold curve using the first GPU circuitry further includes further reducing the first portion of the tensor along the range dimension; and further reducing the second portion of the tensor along the range dimension.

Example 4 provides the method of example 1, the tensor including an azimuth dimension and a Doppler dimension, where reducing the data representing the RADAR signal using second GPU circuitry includes splitting the data in the tensor along the Doppler dimension to generate a third portion of the tensor and a fourth portion of the tensor, the third portion of the tensor including a first range of Dopplers, and the fourth portion of the tensor including a second range of Dopplers; reducing, by a first portion of the second GPU circuitry, the third portion of the tensor along the azimuth dimension; and reducing, by a second portion of the second GPU circuitry, the fourth portion of the tensor along the azimuth dimension.

Example 5 provides the method of example 1, where the tensor has a range dimension, a Doppler dimension, an azimuth dimension, and an elevation dimension.

Example 6 provides the method of example 5, further including reducing a size of the tensor by performing Monte Carlo importance sampling of the tensor in the Doppler dimension.

Example 7 provides the method of example 6, where the importance sampling identifies at least two slices of data in the tensor, each of the identified slices of data having a respective Doppler value.

Example 8 provides a system for filtering RADAR data, the system including circuitry to receive data representing a RADAR signal, the data including a tensor having multiple dimensions; first GPU circuitry to calculate a threshold curve, the first GPU circuitry including a first portion of to process a first portion of the tensor, and a second portion to process a second portion of the tensor; and second GPU circuitry to reduce the data representing the RADAR signal using parallel processing, and compare the reduced data to the threshold curve; the system further to output detections based on the threshold curve.

Example 9 provides the system of example 8, where the first GPU circuitry includes a first GPU, and the second GPU circuitry includes a second GPU.

Example 10 provides the system of example 8, further including third GPU circuitry to refine the detections, the system to output the refined detections.

Example 11 provides the system of example 8, where the tensor includes an azimuth dimension and a Doppler dimension, and the first GPU circuitry is to split the data in the tensor along the azimuth dimension, the first portion of the tensor including a first range of azimuths, and the first portion of the tensor including a second range of azimuths; reduce, by the first portion of the first GPU circuitry, the first portion of the tensor along the Doppler dimension; and reduce, by the second portion of the first GPU circuitry, the second portion of the tensor along the Doppler dimension.

Example 12 provides the system of example 11, where the tensor further includes a range dimension, and the first GPU circuitry is further to further reduce the first portion of the tensor along the range dimension; and further reduce the second portion of the tensor along the range dimension.

Example 13 provides the system of example 8, where the tensor includes an azimuth dimension and a Doppler dimension, and the second GPU circuitry is to split the data in the tensor along the Doppler dimension to generate a third portion of the tensor and a fourth portion of the tensor, the third portion of the tensor including a first range of Dopplers, and the fourth portion of the tensor including a second range of Dopplers; reduce, by a first portion of the second GPU circuitry, the third portion of the tensor along the azimuth dimension; and reduce, by a second portion of the second GPU circuitry, the fourth portion of the tensor along the azimuth dimension.

Example 14 provides the system of example 8, where the tensor has a range dimension, a Doppler dimension, an azimuth dimension, and an elevation dimension, and the system is further to reduce a size of the tensor by performing Monte Carlo importance sampling of the tensor in the Doppler dimension.

Example 15 provides a non-transitory computer-readable medium storing instructions for filtering RADAR data, the instructions, when executed by a processor, cause the processor to receive data representing a RADAR signal, the data including a tensor having multiple dimensions; calculate a threshold curve using first GPU circuitry, where a first portion of the first GPU circuitry processes a first portion of the tensor, and a second portion of the first GPU circuitry processes a second portion of the tensor; reduce the data representing the RADAR signal using second GPU circuitry; compare the reduced data to the threshold curve; and output detections based on the threshold curve.

Example 16 provides the computer-readable medium of example 15, where the tensor including an azimuth dimension and a Doppler dimension, and calculating the threshold curve using the first GPU circuitry includes splitting the data in the tensor along the azimuth dimension, the first portion of the tensor including a first range of azimuths, and the first portion of the tensor including a second range of azimuths; reducing, by the first portion of the first GPU circuitry, the first portion of the tensor along the Doppler dimension; and reducing, by the second portion of the first GPU circuitry, the second portion of the tensor along the Doppler dimension.

Example 17 provides the computer-readable medium of example 16, where the tensor further includes a range dimension, and calculating the threshold curve using the first GPU circuitry further includes further reducing the first portion of the tensor along the range dimension; and further reducing the second portion of the tensor along the range dimension.

Example 18 provides the computer-readable medium of example 15, where the tensor includes an azimuth dimension and a Doppler dimension, where reducing the data representing the RADAR signal using second GPU circuitry includes splitting the data in the tensor along the Doppler dimension to generate a third portion of the tensor and a fourth portion of the tensor, the third portion of the tensor including a first range of Dopplers, and the fourth portion of the tensor including a second range of Dopplers; reducing, by a first portion of the second GPU circuitry, the third portion of the tensor along the azimuth dimension; and reducing, by a second portion of the second GPU circuitry, the fourth portion of the tensor along the azimuth dimension.

Example 19 provides the computer-readable medium of example 15, where the tensor has a range dimension, a Doppler dimension, an azimuth dimension, and an elevation dimension, and the instructions are further to reduce a size of the tensor by performing Monte Carlo importance sampling of the tensor in the Doppler dimension.

Example 20 provides the computer-readable medium of example 19, where the importance sampling identifies at least two slices of data in the tensor, each of the identified slices of data having a respective Doppler value.

Example 21 includes an apparatus comprising means for performing the method of any of the examples 1-7.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer implemented method for filtering radio detection and ranging (RADAR) data comprising:
receiving data representing a RADAR signal, the data comprising a tensor having multiple dimensions;
calculating a threshold curve using first graphical processing unit (GPU) circuitry, wherein a first portion of the first GPU circuitry processes a first portion of the tensor, and a second portion of the first GPU circuitry processes a second portion of the tensor;
reducing the data representing the RADAR signal using second GPU circuitry;
comparing the reduced data to the threshold curve; and
outputting detections based on the threshold curve.

2. The computer implemented method of claim 1, the tensor comprising an azimuth dimension and a Doppler dimension, wherein calculating the threshold curve using the first GPU circuitry comprises:
splitting the tensor along the azimuth dimension, the first portion of the tensor comprising a first range of azimuths, and the first portion of the tensor comprising a second range of azimuths;
reducing, by the first portion of the first GPU circuitry, the first portion of the tensor along the Doppler dimension; and
reducing, by the second portion of the first GPU circuitry, the second portion of the tensor along the Doppler dimension.

3. The computer implemented method of claim 2, the tensor further comprising a range dimension, wherein calculating the threshold curve using the first GPU circuitry further comprises:
further reducing the first portion of the tensor along the range dimension; and
further reducing the second portion of the tensor along the range dimension.

4. The computer implemented method of claim 1, the tensor comprising an azimuth dimension and a Doppler dimension, wherein reducing the data representing the RADAR signal using second GPU circuitry comprises:
splitting the tensor along the Doppler dimension to generate a third portion of the tensor and a fourth portion of the tensor, the third portion of the tensor comprising a first range of Dopplers, and the fourth portion of the tensor comprising a second range of Dopplers;
reducing, by a first portion of the second GPU circuitry, the third portion of the tensor along the azimuth dimension; and
reducing, by a second portion of the second GPU circuitry, the fourth portion of the tensor along the azimuth dimension.

5. The computer implemented method of claim 1, wherein the tensor has a range dimension, a Doppler dimension, an azimuth dimension, and an elevation dimension.

6. The computer implemented method of claim 5, further comprising:
reducing a size of the tensor by performing Monte Carlo importance sampling of the tensor in the Doppler dimension.

7. The computer implemented method of claim 6, wherein the importance sampling identifies at least two slices of data in the tensor, each of the identified slices of data having a respective Doppler value.

8. A system for filtering radio detection and ranging (RADAR) data, the system comprising:
circuitry to receive data representing a RADAR signal, the data comprising a tensor having multiple dimensions;
first graphical processing unit (GPU) circuitry to calculate a threshold curve, the first GPU circuitry comprising:
a first portion of to process a first portion of the tensor, and
a second portion to process a second portion of the tensor; and
second GPU circuitry to:
reduce the data representing the RADAR signal using parallel processing, and
compare the reduced data to the threshold curve;
the system further to output detections based on the threshold curve.

9. The system of claim 8, wherein the first GPU circuitry comprises a first GPU, and the second GPU circuitry comprises a second GPU.

10. The system of claim 8, further comprising third GPU circuitry to refine the detections, the system to output the refined detections.

11. The system of claim 8, wherein the tensor comprises an azimuth dimension and a Doppler dimension, and the first GPU circuitry is to:
split the tensor along the azimuth dimension, the first portion of the tensor comprising a first range of azimuths, and the first portion of the tensor comprising a second range of azimuths;
reduce, by the first portion of the first GPU circuitry, the first portion of the tensor along the Doppler dimension; and
reduce, by the second portion of the first GPU circuitry, the second portion of the tensor along the Doppler dimension.

12. The system of claim 11, wherein the tensor further comprises a range dimension, and the first GPU circuitry is further to:
further reduce the first portion of the tensor along the range dimension; and
further reduce the second portion of the tensor along the range dimension.

13. The system of claim 8, wherein the tensor comprises an azimuth dimension and a Doppler dimension, and the second GPU circuitry is to:
split the tensor along the Doppler dimension to generate a third portion of the tensor and a fourth portion of the tensor, the third portion of the tensor comprising a first range of Dopplers, and the fourth portion of the tensor comprising a second range of Dopplers;
reduce, by a first portion of the second GPU circuitry, the third portion of the tensor along the azimuth dimension; and
reduce, by a second portion of the second GPU circuitry, the fourth portion of the tensor along the azimuth dimension.

14. The system of claim 8, wherein the tensor has a range dimension, a Doppler dimension, an azimuth dimension, and an elevation dimension, and the system is further to reduce a size of the tensor by performing Monte Carlo importance sampling of the tensor in the Doppler dimension.

15. A non-transitory computer-readable medium storing instructions for filtering radio detection and ranging (RADAR) data, the instructions, when executed by a processor, cause the processor to:

receive data representing a RADAR signal, the data comprising a tensor having multiple dimensions;

calculate a threshold curve using first graphical processing unit (GPU) circuitry, wherein a first portion of the first GPU circuitry processes a first portion of the tensor, and a second portion of the first GPU circuitry processes a second portion of the tensor;

reduce the data representing the RADAR signal using second GPU circuitry;

compare the reduced data to the threshold curve; and output detections based on the threshold curve.

16. The computer-readable medium of claim 15, wherein the tensor comprising an azimuth dimension and a Doppler dimension, and calculating the threshold curve using the first GPU circuitry comprises:

splitting the tensor along the azimuth dimension, the first portion of the tensor comprising a first range of azimuths, and the first portion of the tensor comprising a second range of azimuths;

reducing, by the first portion of the first GPU circuitry, the first portion of the tensor along the Doppler dimension; and reducing, by the second portion of the first GPU circuitry, the second portion of the tensor along the Doppler dimension.

17. The computer-readable medium of claim 16, wherein the tensor further comprises a range dimension, and calculating the threshold curve using the first GPU circuitry further comprises:

further reducing the first portion of the tensor along the range dimension; and further reducing the second portion of the tensor along the range dimension.

18. The computer-readable medium of claim 15, wherein the tensor comprises an azimuth dimension and a Doppler dimension, wherein reducing the data representing the RADAR signal using second GPU circuitry comprises:

splitting the tensor along the Doppler dimension to generate a third portion of the tensor and a fourth portion of the tensor, the third portion of the tensor comprising a first range of Dopplers, and the fourth portion of the tensor comprising a second range of Dopplers;

reducing, by a first portion of the second GPU circuitry, the third portion of the tensor along the azimuth dimension; and reducing, by a second portion of the second GPU circuitry, the fourth portion of the tensor along the azimuth dimension.

19. The computer-readable medium of claim 15, wherein the tensor has a range dimension, a Doppler dimension, an azimuth dimension, and an elevation dimension, and the instructions are further to:

reduce a size of the tensor by performing Monte Carlo importance sampling of the tensor in the Doppler dimension.

20. The computer-readable medium of claim 19, wherein the importance sampling identifies at least two slices of data in the tensor, each of the identified slices of data having a respective Doppler value.

* * * * *